UNITED STATES PATENT OFFICE.

HORATIO B. BRACE AND WILLIAM T. SWART, OF CANANDAIGUA, N. Y.

IMPROVED COMPOUND BURNING-FLUID FOR ILLUMINATION.

Specification forming part of Letters Patent No. 54,495, dated May 8, 1866.

*To all whom it may concern:*

Be it known that we, HORATIO B. BRACE and WILLIAM T. SWART, of Canandaigua, in the county of Ontario and State of New York, have invented a new and useful composition, it being a burning oil or fluid for domestic and public illuminating purposes; and we do hereby declare that the following is a full and exact description thereof.

The nature of our invention and discovery consists in so forming a composition for the above purposes that, while it possesses all the good and desirable qualities and advantages of the standard burning oils and fluids in common use, we obviate the great objection to those articles by our discovery, inasmuch as the use of them is attended with serious dangers, besides being troublesome and disagreeable.

Our invention therefore consists in so treating and combining gasoline, benzine, naphtha, or any equivalent article with the substances named in the schedule that, while its volatile properties are in a great measure destroyed, it is rendered non-explosive and adapted to common use in lamps without globe or chimney. It thus becomes a safe, convenient, and desirable burning oil or fluid for domestic and public use.

In the treatment of gasoline, benzine, naphtha, or its equivalent in the manufacture of our composition, we use the articles named in the following schedule, viz: benzine, naphtha, or gasoline, forty gallons; carbonate of potassa, one pound; sulphate of alumina, one pound; muriate of soda, one pound; gum-benzoin, two pounds; gum-camphor, one-quarter pound; spirits of niter, three pounds.

The above proportions may be considerably varied without any serious detriment to the compound.

These ingredients may be all mixed together in a suitable vessel, and in a few hours the fluid will be ready for use.

Instead of carbonate of potassa the bitartrate or other salts of potassa may be used; and instead of muriate of soda the muriate of potassa or some of the other salts of soda may be employed to good advantage.

The spirits of niter may be omitted altogether without serious detriment to the essential qualities of the fluid, and is not, therefore, deemed a necessary ingredient in our burning-fluid.

The chief office of the gum-camphor and gum-benzoin is to give an agreeable odor to the burning-fluid. They also increase the whiteness of the light produced; but this effect can be produced by a proper regulation of the wick and burner without the addition of these ingredients. We, however, prefer their use, especially that of gum-benzoin.

What we claim as new, and desire to secure by Letters Patent, is—

A burning-fluid for illuminating purposes, composed substantially of the ingredients above described, and in about the proportions herein contemplated.

H. B. BRACE.
W. T. SWART.

Witnesses:
I. HINMAN SMITH,
WILLARD BATES.